United States Patent

[11] 3,556,279

| [72] | Inventor | James F. Cotter |
| | | Lancaster, Ohio |
| [21] | Appl. No. | 727,467 |
| [22] | Filed | May 8, 1968 |
| [45] | Patented | Jan. 19, 1971 |
| [73] | Assignee | Anchor Hocking Corporation |
| | | Lancaster, Ohio |
| | | a corporation of Delaware |

[54] ROTARY INSPECTING MEANS FOR NONROUND ARTICLES
9 Claims, 3 Drawing Figs.

[52] U.S. Cl. ................................................. 198/29
[51] Int. Cl. ................................................. B65g 47/22
[50] Field of Search ...................................... 198/25, 33(R2), 22, 22B, 29; 53/367, (Inquired)

[56] References Cited
UNITED STATES PATENTS
1,556,857  10/1925  Lloyd ........................... 198/135X
2,865,158  12/1958  Wakeman ..................... 198/22X FOREIGN PATENTS
257,587  8/1927  Great Britain ................ 198/22

Primary Examiner—Edward A. Sroka
Attorney—Norman N. Holland

ABSTRACT: Apparatus for transporting articles to an inspecting station and for rotating the articles about a predetermined axis during an article inspecting or similar operation. The apparatus is particularly adapted for handling nonround articles and for positioning such articles for rotation about a predetermined vertical axis. The rotating means comprises a turntable and the means for centering the articles on the turntable comprises a pair of cooperating pocket wheels. An article locating pocket is formed above the turntable by adjacent pockets in the two pocket wheels. In addition to the locating pocket, a centering plunger may be used for the final positioning of articles having an open central mouth.

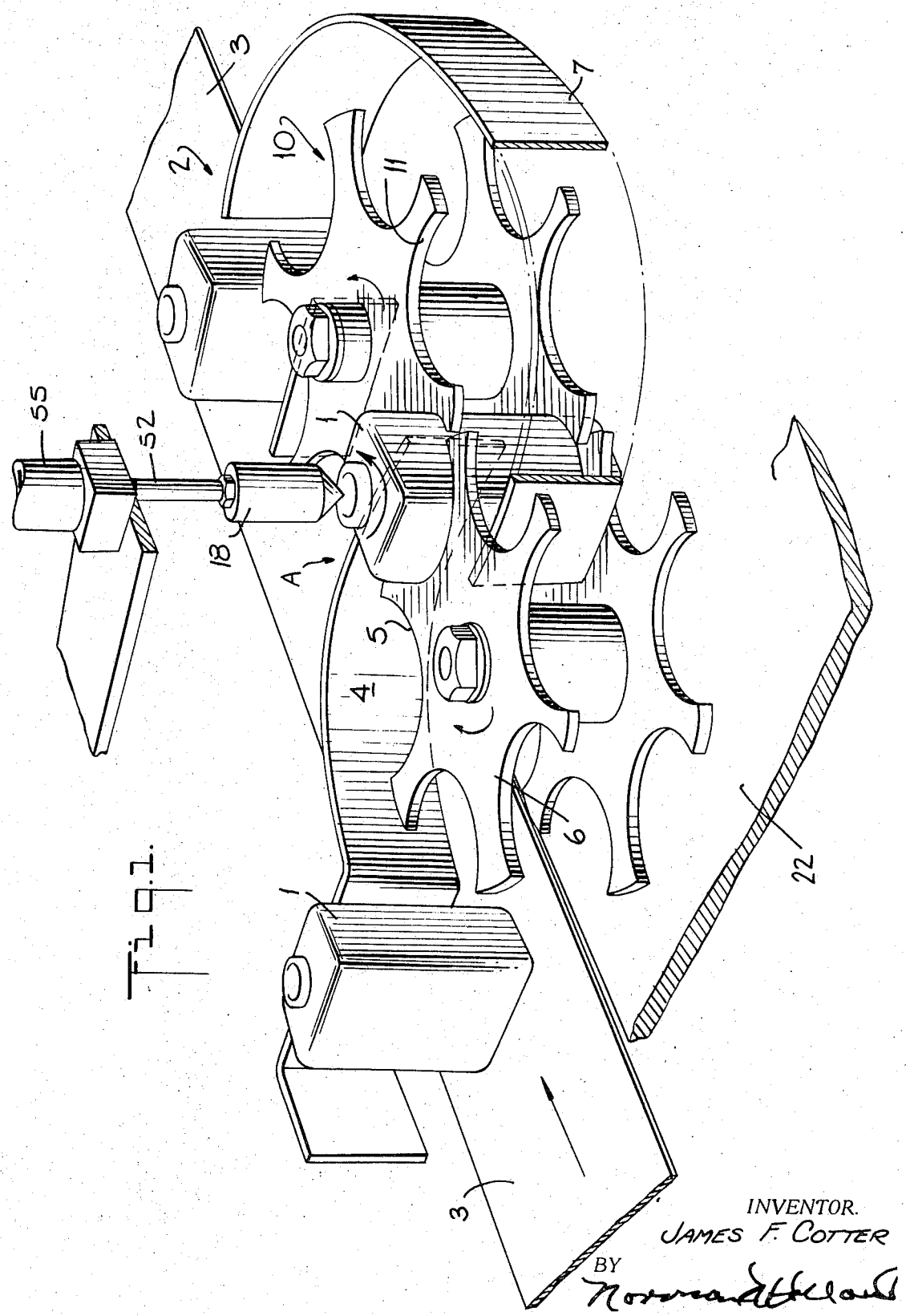

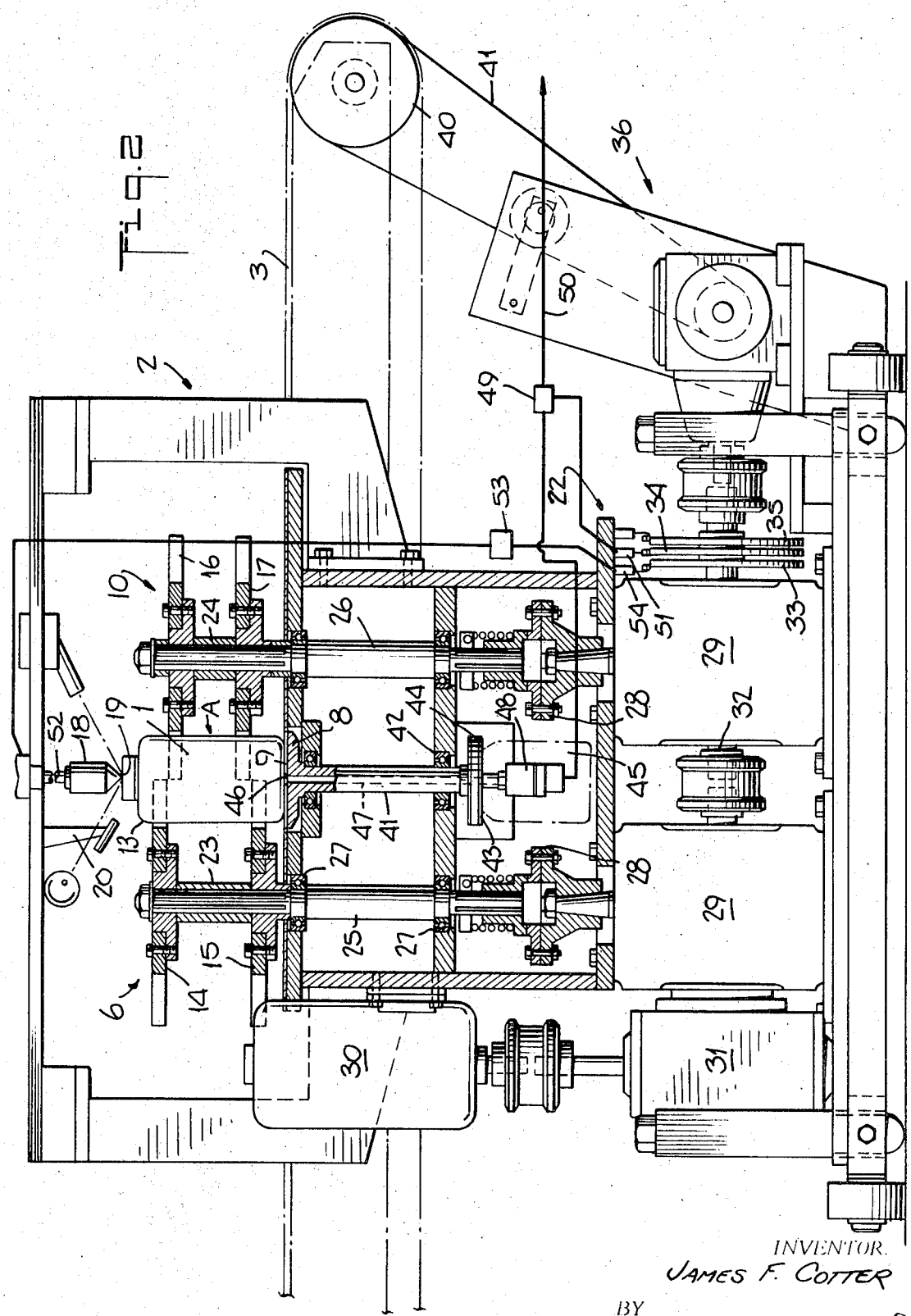

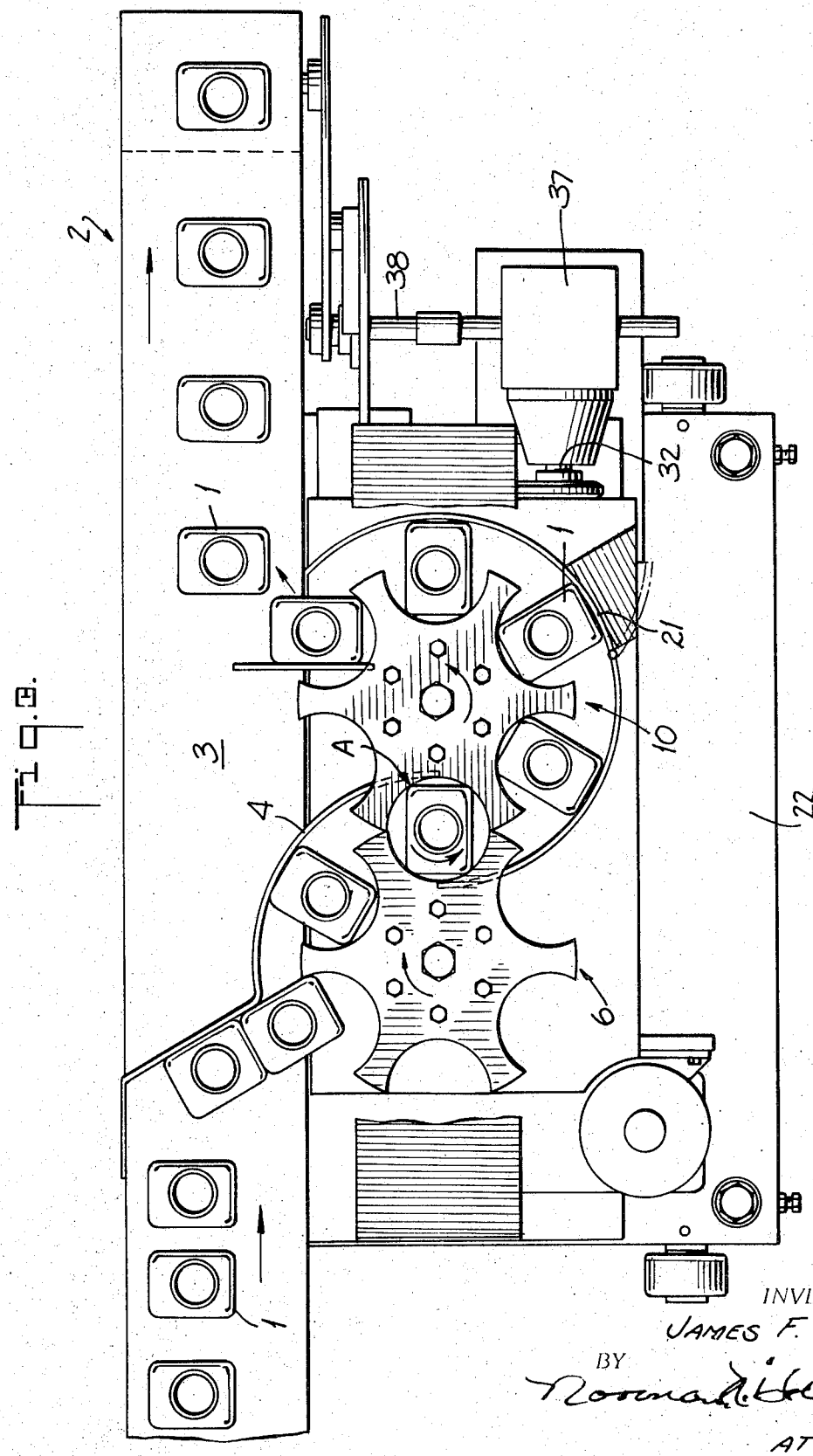

ROTARY INSPECTING MEANS FOR NONROUND ARTICLES

BACKGROUND OF INVENTION

The present invention relates to automatic means for inspecting articles such as glass containers and the like and in particular it relates to a means for centering a nonround article on an article rotating turntable and for permitting the article to be rotated at relatively high speeds for an optical or other inspection operation.

A variety of automatic inspecting means are now in use for inspecting articles such as glass containers for cracks and checks and other flaws. These inspecting devices include means for moving the articles to an inspection station where portions of the articles are scanned by electrooptical or mechanical means to detect the flaws. One such device, for example, is used to inspect the circular rim of a glass container. The container is rotated at the inspecting station while a beam of light is directed onto the rim portion being inspected. When a flaw is present, it changes the optical properties of the glass article thereby causing the inspecting beam to be redirected with respect to a photoelectric flaw sensing head. Where the articles being inspected are symmetrical as, for example, in the case of round jars, there is no particular problem in locating the article at the jar rotating means. A problem is encountered, however, where the article may have a rectangular or other nonround cross section.

In order to carefully inspect circular rims by optical or other means it is desirable to rotate the articles about the center of the rim. Similarly it is desirable in inspecting other portions of containers to have the containers turn about a suitable rotational axis which balances the rotating articles thereby giving a smooth article rotation.

SUMMARY OF THE INVENTION

The apparatus of the present invention provides such a centering or positioning means which is particularly effective in connection with articles having a rectangular cross section such as the well-known two quart glass milk bottle or other fluid containers. These rectangular containers are used in enormous quantities for two quart or one gallon packages and it is desirable to have a reliable high speed fault detecting system for use in the manufacturing line for these food packages. The article handling device of the present invention, for example, will receive and position such a container so that the container is rotated about an axis passing through the center of the circular container rim. Where the rim itself is located centrally of the container cross section, this positioning about a vertical axis through the rim center is also useful for inspecting portions of the article surface other than the rim.

Accordingly, an object of the present invention is to provide improved apparatus for inspecting articles such as glass containers and the like.

Another object of the present invention is to provide an improved article inspecting means for nonround glass containers or other articles.

Another object of the present invention is to provide a simplified automatic means for positioning a nonround article for rotation about a predetermined axis.

Another object of the present invention is to provide an improved method of locating a nonround object on a turntable.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a fragmentary perspective view illustrating the article positioning pocket wheels of a preferred embodiment of the apparatus in accordance with the present invention;

FIG. 2 is a front elevational view partially in section of the apparatus; and

FIG. 3 is a top plan view of the apparatus of FIGS. 1 and 2.

DESCRIPTION OF THE PREFERRED EMBODIMENT

The general operation of the machine will first be described by following an article along its path through the machine as best seen in FIGS. 1 and 3. Rectangular bottles 1 which are to be inspected are fed to the inspecting machine 2 by the conveyor 3. A suitably positioned guide rail 4 extends across the conveyor 3 directing the moving bottles 1 into a pocket 5 in the first pocket wheel 6. This pocket wheel 6, as will be more fully described below, is intermittently turned to carry the bottles 1 to the inspecting position A. Thus, a six-pocket wheel as illustrated is intermittently stepped 60° or one sixth of a complete revolution of the pocket wheel 6. A guide rail 7 confines the bottles 1 to the pocket 5 in the pocket wheel 6 and may partly turn the bottles within the pocket when necessary to permit the advance of the wheel 6 towards the inspecting position A. The article inspecting turntable 8 has its upper or article supporting surface 9 positioned centrally of the inspecting station A so that the turntable 8 may rotate the bottles 1 at this position at a relatively high inspecting speed when desired.

A second pocket wheel 10 having a similar number of pockets 11 to that of the first pocket wheel 6 is used to complete an article centering pocket 5, 11 above the turntable 8. The two cooperating pockets 5 and 11 each shaped in the form of a semicircle cooperate, as illustrated, to form an article confining pocket at the inspecting position which is circular. In the preferred embodiment where each of the pocket wheels 6 and 10 has spaced upper and lower sections 14, 15 and 16, 17 as illustrated in FIG. 2 the pocket 5, 11 is generally cylindrical. When a circular or cylindrical pocket of the type described above has been formed, it is clear that a variety of differently shaped articles may be centered on the turntable 8. In particular, this centering will be useful for articles having a circular mouth which is spaced equidistantly from two or more points on the article cross section. In the case of a rectangular cross section such as is found on 2-quart milk bottles and such as is illustrated in the drawings, the bottle rim 12 will be equidistantly positioned from the four bottle corners 13 on the circle described by pocket 5, 11 so that the center of the bottle rim 12 will be positioned at the center axis of the rotating turntable 8.

It is seen that a similar positioning action will result for square articles where the center of a square jar rim is equidistantly positioned from the four corners of the article cross section. A triangular bottle where the bottle rim is similarly equidistantly positioned from the three points of the bottle cross section will be similarly centered.

Other cross sections may similarly be positioned within such a cylindrical or circular pocket even though the centering may be less established. A bottle having an oval cross section, for example, would be centered where the two extreme radial portions of the bottle would be forced to opposite ends of a diameter of the inspecting pocket.

The turntable 8 may be continuously rotating and while thus rotating it will facilitate the above described centering action.

In addition, a further precise centering of an article may be obtained by the use of a conical centering plunger 18 mounted above the turntable 8 with its point 19 positioned at the turntable 8 center and with portions of the plunger above the point having a flared camming surface to urge the rim 12 of the rotating container 1 in such a direction as to center the container 1 on the turntable 8. A vacuum may be applied to the rotating turntable 8 to lock the article thereon after the initial centering action described above and to thereafter retain the article in its precisely centered position by the above described centering means. The centering as described above will be performed during the initial portion of a dwell period during the pocket wheel movement. The subsequent portion of the dwell period may be utilized for an optical or other inspection. As the inspection is completed, a subsequent stepped movement of the two pocket wheels 6 and 10 carries the inspected container 1 around to its discharge position on the conveyor belt 3 if no flaw has been detected.

If a flaw has been detected the bottle 1 may be marked by a marker 20, if desired, or it may be ejected from the machine at a position other than the main conveyor for destruction or reinspection or other use. This position may include a gate 21 in the guide rail opened by a suitably delayed signal from the inspection machine. A variety of delayed action gate releases are known and may be used and they form no part of the present invention.

A suitable roller-mounted table 22 is provided for mounting the two cooperating pocket wheels. As indicated, these wheels preferably are formed with upper and lower sections consisting of identically shaped pocket wheels. These sections are mounted on hub members 23 and 24 attached to vertical shafts 25 and 26. The shafts 25 and 26 are mounted on bearings 27 in the support table 22 and the lower portions of the shafts are connected by couplings 28 to the stepped drive means which in the machine illustrated comprise a pair of Ferguson drives 29. The Ferguson drives 29 or other suitable drives are means which provide an intermittent stepped shaft output from a continuously rotating shaft input. Thus, a continuously rotating drive motor 30 is coupled to the Fergusons 29 through a speed reduction box 31 by means of the horizontal shaft 32. Several rotating cams 33—35 are shown at the right-hand end of the shaft 32 (FIG. 2) for operating related devices at the proper time in the dwell period. One such cam 33 may be used for lowering and raising the centering plunger 16 and another cam 34 may be used to apply vacuum to the rotating turntable to hold the articles in their centered position during the inspecting time. A third cam 35 may control the activation and deactivation of the photoelectric or other inspecting means. This same continuously rotating shaft 32 may also be used to drive the article conveyor 3 through the coupling 36 shown in FIG. 2. This coupling comprises a speed changing box 37 with an output shaft 38 which is coupled to the conveyor 3 through the intermediation of pulleys 39 and 40 and a chain 41.

The turntable forms 8 the upper portion of a vertical shaft 41 mounted in spaced bearings 42 in the table 22 and having a drive pulley 43 at its lower end. The drive pulley 43 is coupled by belt 44 to a continuously operating drive motor 45. The surface 9 of the turntable has a vacuum outlet 46 coupled to a source of vacuum through the vertical conduit 47 and through a connecting bearing or gland 48 attached to the lower end of the rotating shaft 41. An electrically operated valve 49 in the vacuum line 50 is operated by switch 51 and the above-mentioned control cam 34 to apply the vacuum at the desired interval.

As already described, a further centering means in addition to the above-described pocket wheels 6 and 10 may be used for a precise centering of the bottles 1 or other articles on the turntable 8. This centering means preferably includes a conical centering plunger 18 arranged in combination with the particular circular rim being run to precisely center the rim at the axis of the rotating turntable 8. The bottle contacting portion of the plunger 18 may be rotatably mounted on its own shaft 52 to have the centering plunger remain in contact with the bottle 1 during the inspection or the centering plunger 18 may be raised prior to the bottle inspection if this is necessary to clear the rim 12 for the inspection.

The plunger 18 is raised and lowered at the desired time by a timing means such as the above described control cam 33 which operates the plunger 18 by an air supply valve 53 electrically operated by the switch 54 which is opened and closed by cam 33. The plunger 18 is lowered against the force of a suitable lift spring by the air piston 55.

It will be seen that an improved inspecting machine has been provided for inspecting nonround objects where the objects are to be rotated during the inspection about a particular axis. The device is useful for optically inspecting nonround glass articles and particularly where their rims are centered with respect to the extremities of the articles. This is the case in a large number of glass articles such as rectangular beverage or milk bottles or square liquid containers having circular rims with their centers equidistantly spaced from the corners of the article cross section.

The centering device as described is relatively simple in form and reliable in operation for providing a centering with a high degree of precision.

The system as described is also readily adapted for relatively high speed use as is necessary in the case of auxiliary apparatus for a continuous container manufacturing and inspection line. The inspection may be performed in such a way that all or alternatively a representative sample of the articles may be passed through the device for the inspecting sequence.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In article inspecting apparatus an improved means for positioning the article on a rotating inspecting platform comprising the combination of not more than a pair of pocket wheels, the pockets in said wheels being equal in number and forming substantially identical semicircles, and said wheels being rotatably mounted adjacent to one another whereby a pocket in one pocket wheel combines with a pocket in the other pocket wheel to form a generally circular article positioning enclosure concentric with the axis of said platform.

2. The apparatus as claimed in claim 1 which further comprises a conveyor for guiding articles into pockets in one of said pocket wheels, means for intermittently rotating said wheels in synchronism for forming said enclosure, and means for returning articles from said second pocket wheel to said conveyor.

3. The apparatus as claimed in claim 1 which further comprises an article centering plunger movably mounted above the central portion of the platform.

4. The apparatus as claimed in claim 1 which further comprises a conveyor for guiding articles into pockets in one of said pocket wheels, means for intermittently rotating said wheels in synchronism for forming said enclosure, and means for returning articles from said second pocket wheel to said conveyor.

5. The apparatus as claimed in claim 1 which further comprises an article centering means movably mounted above the central portion of the platform.

6. An improved inspecting station for an article inspecting machine comprising the combination of an article supporting turntable, not more than a pair of pocket wheels rotatably mounted on opposite sides of said turntable, the pockets in said wheels being substantially similar and arcuate, said pocket wheels being positioned so that a pocket in one wheel forms a circle above said turntable in combination with a pocket in the other wheel, means for rotating said turntable, and means for turning said pocket wheels in synchronism to advance successive pairs of pockets into position above the turntable.

7. An improved inspecting station for an article inspecting machine comprising the combination of an article supporting turntable, means consisting of a pair of pocket wheels rotatably mounted on opposite sides of said turntable, the pockets in said wheels being substantially similar and arcuate, said pocket wheels being positioned so that a pocket in one wheel forms a circle above said turntable in combination with a pocket in the other wheel, means for rotating said turntable, means for turning said pocket wheels in synchronism to advance successive pairs of pockets into position above the turntable and vacuum means at said turntable for releasably holding articles.

8. An improved inspecting station for an article inspecting machine comprising the combination of an article supporting turntable, not more than a pair of pocket wheels rotatably mounted on opposite sides of said turntable, the pockets in said wheels being substantially similar and semicircular, said pocket wheels being positioned so that a pocket in one wheel forms a circle above said turntable in combination with a pocket in the other wheel, means for rotating said turntable, means for rotating said pocket wheels in synchronism, means above said turntable for engaging and centering articles thereon, and means for raising and lowering said centering means.

9. The station as claimed in claim 8 in which said centering means comprises a plunger which includes a flared camming surface for engaging circular rim portions on the articles.